(12) United States Patent
Fan et al.

(10) Patent No.: US 10,075,886 B2
(45) Date of Patent: Sep. 11, 2018

(54) METHOD AND DEVICE FOR BEAM SWITCHING

(71) Applicant: Telefonaktiebolaget LM Ericsson (publ), Stockholm (SE)

(72) Inventors: Rui Fan, Beijing (CN); Qingyu Miao, Beijing (CN); Zhang Zhang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/023,030

(22) PCT Filed: Mar. 14, 2016

(86) PCT No.: PCT/CN2016/076265
§ 371 (c)(1),
(2) Date: Mar. 18, 2016

(87) PCT Pub. No.: WO2017/063333
PCT Pub. Date: Apr. 20, 2017

(65) Prior Publication Data
US 2017/0265111 A1    Sep. 14, 2017

(51) Int. Cl.
*H04W 36/06*    (2009.01)
*H04W 36/00*    (2009.01)
(52) U.S. Cl.
CPC ....... *H04W 36/06* (2013.01); *H04W 36/0094* (2013.01)
(58) Field of Classification Search
CPC ................ H04W 36/06; H04W 36/0094
See application file for complete search history.

(56) References Cited

U.S. PATENT DOCUMENTS

2010/0165950 A1*  7/2010  Abeta ............... H04W 36/06
                                                   370/332
2016/0270082 A1*  9/2016  Soriaga ............ H04W 72/0486
(Continued)

FOREIGN PATENT DOCUMENTS

CN    101742605 A    6/2010
CN    103228013 A    7/2013
(Continued)

OTHER PUBLICATIONS

International Search Report and the Written Opinion for Application No. PCT/CN2016/076265, dated Dec. 1, 2016, 11 pages.
(Continued)

*Primary Examiner* — Zhiren Qin
*Assistant Examiner* — Harry H Kim
(74) *Attorney, Agent, or Firm* — Nicholson De Vos Webster & Elliott LLP

(57) ABSTRACT

Embodiments of the disclosure generally relate to beam switching in a wireless communication network. A device in the wireless communication network determines a beam switch mode based on a first measurement on quality of a current beam serving a mobile terminal. The beam switch mode is associated with at least one candidate beam. Then, the device sends an indication of the beam switch mode to the mobile terminal to trigger the mobile terminal to perform a second measurement on a mobile reference signal associated with the at least one candidate beam. In response to receiving the second measurement from the mobile terminal, the device determines a target beam from the at least one candidate beam and the current beam based on the second measurement. In this way, the target beam may be determined in an efficient way.

16 Claims, 5 Drawing Sheets

(56) References Cited

U.S. PATENT DOCUMENTS

2017/0223552 A1* 8/2017 Roy ................... H04W 16/14
2017/0280365 A1* 9/2017 Wang .................. H04W 36/30

FOREIGN PATENT DOCUMENTS

| CN | 104581810 A | 4/2015 |
|----|-------------|--------|
| EP | 1986452 A1 | 10/2008 |
| EP | 2928234 A1 | 10/2015 |
| WO | 2015080645 A1 | 6/2015 |
| WO | 2015109153 A1 | 7/2015 |

OTHER PUBLICATIONS

Extended European Search Report for Application No. 16847581.2, dated Jan. 16, 2018, 8 pages.

Tuong H.D., et al., "Handover Protocol Based on Estimated Received Signal Strength for Target Beam in Beam Division Cellular Communication systems," 2013 IEEE 78th Vehicular Technology Conference (VTC Fall), IEEE, Sep. 2, 2013, XP032548507, 5 pages.

International Preliminary Report on Patentability for Application No. PCT/CN2016/076265, dated Jul. 10, 2018, 6 pages.

* cited by examiner

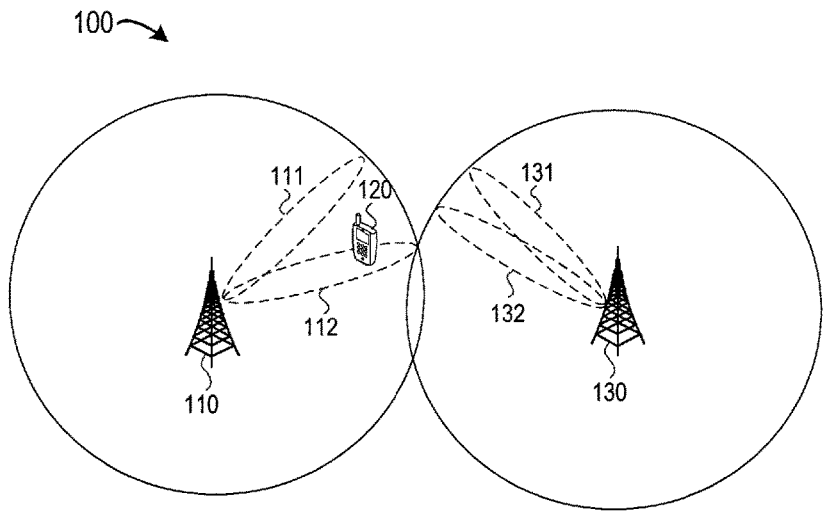

FIG. 1

DETERMINE A BEAM SWITCH MODE BASED ON A FIRST MEASUREMENT ON QUALITY OF A CURRENT BEAM SERVING A MOBILE TERMINAL — 210

SEND AN INDICATION OF THE BEAM SWITCH MODE TO THE MOBILE TERMINAL TO TRIGGER THE MOBILE TERMINAL TO PERFORM A SECOND MEASUREMENT ON A MOBILE REFERENCE SIGNAL ASSOCIATED WITH THE AT LEAST ONE CANDIDATE BEAM — 220

IN RESPONSE TO RECEIVING THE SECOND MEASUREMENT FROM THE MOBILE TERMINAL, DETERMINE A TARGET BEAM FROM THE AT LEAST ONE CANDIDATE BEAM AND THE CURRENT BEAM BASED ON THE SECOND MEASUREMENT — 230

METHOD AND DEVICE FOR BEAM SWITCHING

CROSS-REFERENCE TO RELATED APPLICATIONS

This application is a National stage of International Application No. PCT/CN2016/076265, filed Mar. 14, 2016, which is hereby incorporated by reference.

TECHNICAL FIELD

Embodiments of the present disclosure generally relate to the field of communications, and more particularly, to a method and device for beam switching.

BACKGROUND

Wireless communication systems are advancing to provide good service quality, support a high data rate and keep up with the continuously increasing demand for wireless data traffic.

Traditionally, reference signals (RSs) are used to determine service quality of cells. By way of example, Channel State Information Reference Signal (CSI-RS) or Demodulation Reference Signal (DMRS) may be transmitted from multiple cells to mobile terminals. By means of measuring CSI-RS or DMRS from neighboring cells, a mobile terminal can know cell quality of its serving cell and neighboring cells and then report back to a base station serving the mobile terminal, so that the base station determines which cell the mobile terminal should connect to.

In recent wireless communication systems, a cell is provided by a beam of a base station, and a base station has a plurality of beams and thus provides multiple cells. As to a beam provided by a base station, there may be neighboring beams, including beams (also referred to as "local beams" hereafter) provided by the same base station and beams (also referred to as "neighbor beams" hereafter) provided by neighbor base stations.

For purpose of reducing interferences generated by the RSs which are always on, mobility reference signals (MRSs) have been proposed to be transmitted on demand. In this case, the mobile terminal and/or the base station do not know the neighboring beam quality until the MRSs are activated and transmitted. There are generally two modes to trigger the MRSs, namely an intra-node beam switch mode and an inter-node beam switch mode. In the intra-node beam switch mode, if quality of a serving beam is low, MRSs will be triggered to be transmitted from the local beams. In inter-node beam switch mode, if quality of a serving beam is low, MRSs will be triggered to be transmitted from the neighbor beams.

Conventionally, in the case that the quality of the serving beam is low, both the inter-node beam switch mode and the intra-node beam switch mode are triggered. As such, MRSs will be triggered to be transmitted from both the local beams and neighbor beams to the mobile terminal, and the mobile terminal has to measure all the received MRSs. Since there is no differentiation between the intra-node beam switch and the inter-node beam switch mode, an undesirable signaling overhead and work load issue would occur and needs to be mitigated.

SUMMARY

In general, embodiments of the present disclosure provide a solution for beam switching in a wireless communication network.

In a first aspect, a method implemented by a device in a wireless communication network is provided. The device determines a beam switch mode based on a first measurement on quality of a current beam serving a mobile terminal. The beam switch mode is associated with at least one candidate beam. Then, the device sends an indication of the beam switch mode to the mobile terminal to trigger the mobile terminal to perform a second measurement on a mobile reference signal associated with the at least one candidate beam. In response to receiving the second measurement from the mobile terminal, the device determines a target beam from the at least one candidate beam and the current beam based on the second measurement. The corresponding computer program is also provided.

In one embodiment, determining the beam switch mode may include: in response to the first measurement being between a first threshold value and a second threshold value less than the first threshold value, determining an intra-node beam switch mode as the beam switch mode; and in response to the first measurement being below the second threshold value, determining an inter-node beam switch mode as the beam switch mode.

In one embodiment, the method may further include: in response to an intra-node beam switch mode being determined as the beam switch mode, determining the at least one candidate beam from a set of beams provided by the device, the set of beams excluding the current beam; and sending a mobile reference signal to the mobile terminal via the at least one candidate beam.

In one embodiment, the method may further include: in response to an inter-node beam switch mode being determined as the beam switch mode, determining the at least one candidate beam from a set of beams provided by a neighbor device of the device; and triggering the neighbor device to send a mobile reference signal to the mobile terminal via the at least one candidate beam.

In one embodiment, the method may further include: determining a measurement scheme associated with the beam switch mode, the measurement scheme specifying a manner for performing the second measurement; and sending an indication of the measurement scheme to the mobile terminal.

In one embodiment, determining the measurement scheme may include: in response to the intra-node beam switch mode being determined as the beam switch mode, determining a first measurement scheme for measuring a first number of samples of the mobile reference signal, the first number being below a threshold number; and in response to the inter-node beam switch mode being determined as the beam switch mode, determining a second measurement scheme for measuring and filtering a second number of samples of the mobile reference signal, the second number exceeding the threshold number.

In one embodiment, the method may further include: determining a report scheme associated with the beam switch mode, the report scheme specifying a manner for reporting the second measurement; and sending an indication of the report scheme to the mobile terminal.

In one embodiment, determining the report scheme may include: in response to the intra-node beam switch mode being determined as the beam switch mode, determining a first report scheme for reporting the second measurement in a condensed format; and in response to the inter-node beam switch mode being determined as the beam switch mode, determining a second report scheme for reporting the second measurement in an uncondensed format.

In one embodiment, the at least one candidate beam include a plurality of candidate beams. Determining the target beam may include: determining a maximum measurement from a plurality of second measurements associated with the plurality of candidate beams; in response to the maximum measurement exceeding the first measurement, determining a candidate beam corresponding to the maximum measurement from the plurality of candidate beams as the target beam; and in response to the maximum measurement being below the first measurement, determining the current beam as the target beam.

In one embodiment, the method may further include: sending a mobile reference signal to the mobile terminal via the current beam; and receiving, from the mobile terminal, a third measurement on the mobile reference signal sent via the current beam. Determining the target beam may include: in response to the second measurement exceeding the third measurement, determining the candidate beam as the target beam; and in response to the second measurement being below the third measurement, determining the current beam as the target beam.

In a second aspect, a method implemented by a mobile terminal in a wireless communication network is provided. The mobile terminal receives an indication of a beam switch mode from a device. The indication is determined based on a first measurement on quality of a current beam serving the mobile terminal, and the beam switch mode is associated with at least one candidate beam. The mobile terminal then performs a second measurement on a mobile reference signal associated with the at least one candidate beam. After that, the mobile terminal transmit the second measurement to the device to trigger the device to determine a target beam from the at least one candidate beam and the current beam based on the second measurement.

In one embodiment, the intra-node beam switch mode is determined as the beam switch mode, the at least one candidate beam is determined from a set of beams provided by the device, and the set of beams excludes the current beam. The method may further include: receiving a mobile reference signal from the device via the at least one candidate beam.

In one embodiment, the inter-node beam switch mode is determined as the beam switch mode, and the at least one candidate beam is determined based on a set of beams provided by a neighbor device of the device. The method may further include: receiving a mobile reference signal from the neighbor device via the at least one candidate beam.

In one embodiment, the method may further include: receiving an indication of a report scheme from the device, the report scheme being associated with the beam switch mode and specifying a manner for reporting the second measurement, and transmitting the second measurement to the device according to the report scheme.

In one embodiment, the method may further include: receiving an indication of a measurement scheme from the device, the measurement scheme specifying a manner for performing the second measurement. Performing a second measurement on a mobile reference signal may include: performing the second measurement according to the measurement scheme.

In one embodiment, the method may further include: performing a third measurement on a mobile reference signal sent via the current beam; and transmitting the third measurement to the device.

In a third aspect, a device in a wireless communication network is provided. The device includes a controller and a transceiver. The controller is configured to determine a beam switch mode based on a first measurement on quality of a current beam serving a mobile terminal, the beam switch mode being associated with at least one candidate beam. The transceiver is configured to send an indication of the beam switch mode to the mobile terminal to trigger the mobile terminal to perform a second measurement on a mobile reference signal associated with the at least one candidate beam. The controller is further configured to determine a target beam from the at least one candidate beam and the current beam based on the second measurement.

In a fourth aspect, a mobile terminal in a wireless communication network is provided. The mobile terminal includes a receiver, a controller and a transmitter. The receiver is configured to receive an indication of a beam switch mode from a device, the indication being determined based on a first measurement on quality of a current beam serving the mobile terminal, and the beam switch mode being associated with at least one candidate beam. The controller is configured to perform a second measurement on a mobile reference signal associated with the at least one candidate beam. The transmitter is configured to transmit the second measurement to the device to trigger the device to determine a target beam from the at least one candidate beam and the current beam based on the second measurement.

In a fifth aspect, a device in a wireless communication network is provided. The device includes: a processor and a memory, the memory containing instructions executable by the processor, whereby the processor being adapted to cause the device to: determine a beam switch mode based on a first measurement on quality of a current beam serving a mobile terminal, the beam switch mode being associated with at least one candidate beam; send an indication of the beam switch mode to the mobile terminal to trigger the mobile terminal to perform a second measurement on a mobile reference signal associated with the at least one candidate beam; and in response to receiving the second measurement from the mobile terminal, determine a target beam from the at least one candidate beam and the current beam based on the second measurement.

In a sixth aspect, a mobile terminal in a wireless communication network is provided. The mobile terminal includes: a processor and a memory, the memory containing instructions executable by the processor, whereby the processor being adapted to cause the mobile terminal to: receive an indication of a beam switch mode from a device, the indication being determined based on a first measurement on quality of a current beam serving the mobile terminal, and the beam switch mode being associated with at least one candidate beam; perform a second measurement on a mobile reference signal associated with the at least one candidate beam; and transmit the second measurement to the device to trigger the device to determine a target beam from the at least one candidate beam and the current beam based on the second measurement.

According to embodiments of the present disclosure, a beam switch mode is determined from the intra-node beam switch mode and inter-node beam switch mode according to quality of the current beam, instead of using both of them in an undistinguished way. In this way, it is possible to determine a beam providing better services to the mobile terminal in an effective and efficient way.

BRIEF DESCRIPTION OF THE DRAWINGS

The above and other aspects, features, and benefits of various embodiments of the disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which:

FIG. 1 shows an environment of a wireless communication network 100 in which embodiments of the present disclosure may be implemented;

FIG. 2 shows a flowchart of a method 200 for beam switching implemented by a device in accordance with an embodiment of the present disclosure;

DETAILED DESCRIPTION

Figure 3:
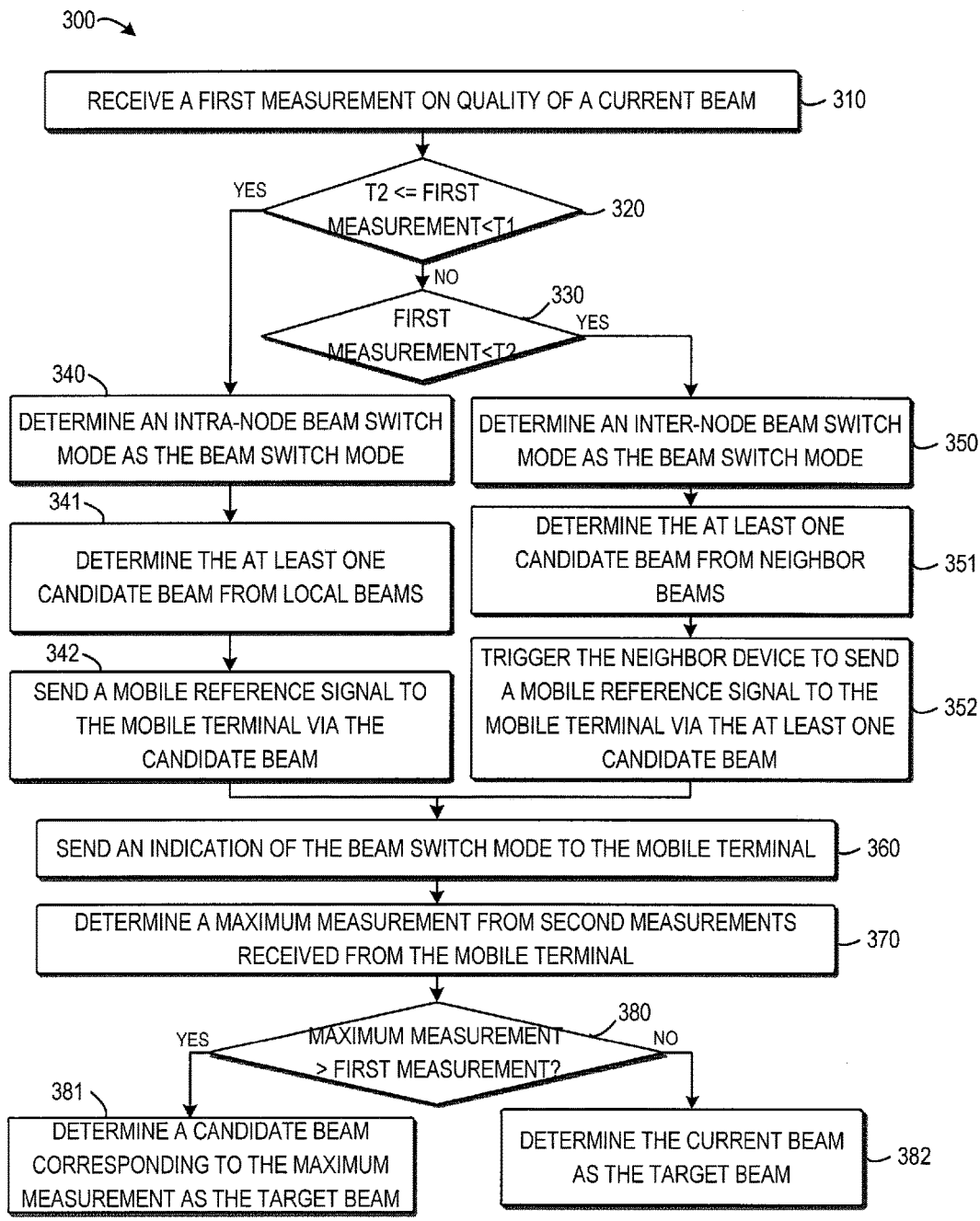
FIG. 3 shows a flowchart of a method 300 for beam switching implemented by a device in accordance with an embodiment of the present disclosure.

The present disclosure will now be discussed with reference to several example embodiments. It should be understood that these embodiments are discussed only for the purpose of enabling those skilled persons in the art to better understand and thus implement the present disclosure, rather than suggesting any limitations on the scope of the present disclosure.

As used herein, the term "device" refers to a base station (BS) or an access point (AP), for example, a node B (NodeB or NB), an evolved NodeB (eNodeB or eNB), a Remote Radio Unit (RRU), a radio header (RH), a remote radio head (RRH), a relay, a low power node such as a femto, a pico, and so forth.

The term "mobile terminal" refers to user equipment (UE), which may be a Subscriber Station (SS), a Portable Subscriber Station, a Mobile Station (MS), or an Access Terminal (AT). The mobile terminal may include, but not limited to, a mobile phone, a cellular phone, a smart phone, a tablet, a wearable device, a personal digital assistant (PDA), and the like.

As used herein, the terms "first" and "second" refer to different elements. The singular forms "a" and "an" are intended to include the plural forms as well, unless the context clearly indicates otherwise. The terms "comprises," "comprising," "has," "having," "includes" and/or "including" as used herein, specify the presence of stated features, elements, and/or components and the like, but do not preclude the presence or addition of one or more other features, elements, components and/or combinations thereof. The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Now some exemplary embodiments of the present disclosure will be described below with reference to the figures. Reference is first made to FIG. 1, which illustrates an environment of a wireless communication network 100 in which embodiments of the present disclosure may be implemented. As shown in FIG. 1, the wireless communication network 100 includes a device, which is implemented as a BS 110, and a mobile terminal 120. The BS 100 acts as a serving node of the mobile terminal 120. In particular, the BS 110 provides two beams 111 and 112, and the mobile terminal 120 is served by the BS 110 via the beam 112. There also illustrates a neighbor device (also referred to as "neighbor node") of the BS 110, namely, BS 130, which provides two beams 131 and 132 for example. For UE 120, the beam 112 is the serving beam, also refers to as a "current beam" hereafter. The beam 111 provided by the serving BS 110 is a local beam, and the beams 131 and 132 provided by the neighbor BS 130 are neighbor beams.

The wireless communication network 100 may follow any suitable communication standards, such as LTE-Advanced (LTE-A), LTE, Wideband Code Division Multiple Access (WCDMA), High-Speed Packet Access (HSPA), and so on. Furthermore, the communications between the mobile terminal 120 and the BS 110/130 in the network 100 may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future.

Conventionally, upon receipt of CSI-RS or DMRS measurement from the mobile terminal 120, the BS 110 determines the quality of the current beam. If the quality is low, MRSs are triggered to be transmitted from both the local beam 111 and neighbor beams 131 and 132 to the mobile terminal 120. The mobile terminal measures all the received MRSs and reports the measurements to the BS 110, so that the BS 110 determines a beam for providing better service quality to the mobile terminal 120. That is, both the inter-node beam switch mode and the intra-node beam switch mode are triggered.

The signaling overhead and the execution delay of the intra-node beam switch mode and the inter-node beam switch mode are different. For the intra-node beam switch mode, the signaling overhead is quite low. The serving node, BS 110, can decide to activate MRS transmission by itself. There is very little delay to switch beam, and once beam is switched, context of the mobile terminal 120 can be reused as much as possible.

For the inter-node beam switch mode, the signaling overhead is quite high. BS 110 triggers a neighboring node, for example, BS 130, to activate MRS transmission. Upon receipt of feedback from the BS 130, the BS 110 sends information about the MRS to the mobile terminal 120. There is a long delay over backhaul and the BS 130 needs to prepare context of the mobile terminal 120. For unsynchronized nodes, the delay and overhead may be even more.

If both the intra-node beam switch mode and the inter-node beam switch mode are triggered, we can expect some performance loss. For instance, if the quality of the current beam 112 is not so bad, and a local beam 111 is good enough to serve the mobile terminal 120, it would cost too much inter-node signaling to activate the MRS transmission from the BS 130.

In order to solve the above and other potential problems, embodiments of the present disclosure provides on-demand MRS transmission from local beam(s) and/or neighbor beam(s). In accordance with embodiments of the present disclosure, upon receipt of measurement (also referred to as "first measurement" hereafter) on quality of the current beam serving the mobile terminal 120, the BS 110 determines a beam switch mode from the inter-node and intra-node beam switch modes based on the first measurement, and sends an indication of the beam switch mode to the mobile terminal 120 to trigger the mobile terminal 120 to perform a measurement (also referred to as "second measurement" hereafter) on MRS(s). If the intra-node beam switch mode is determined as the beam switch mode, the mobile terminal 120 measures MRS sent via the local beam 111 or MRSs sent via both the local beam 111 and the current beam 112, and the BS 110 determines a new serving beam (also referred to as "target beam" hereafter) for the mobile terminal 120 from the local beam 111 and the current beam 112. In the case of the inter-node beam switch mode being determined as the beam switch mode, the mobile terminal 120 measures MRSs sent via the neighbor beams 131 and 132, or MRSs sent via both the neighbor beams 131 and 132 and the current beam 112, and the BS 110 may determine the target beam from the neighbor beams 131 and 132 and the current beam 112.

In this way, the intra-node beam switch mode and the inter-node beam switch mode are performed in an efficient way. As a result, it is possible to reduce signaling overhead and work load of both the BS and mobile terminal.

It is to be understood that the configuration of FIG. 1 is described merely for the purpose of illustration, without suggesting any limitation as to the scope of the present disclosure. Those skilled in the art will appreciate that the wireless communication network 100 may include any suitable number of mobile terminals and BSs and may have other suitable configurations, and each BS may provide any suitable number of beams.

Now reference is made to FIG. 2, which shows a flowchart of a method 200 for beam switching implemented by a device in accordance with an embodiment of the present disclosure. With the method 200, the above and other potential deficiencies in the conventional approaches can be overcome. It would be appreciated by those skilled in the art that the method 200 may be implemented by a device, such as the BS 110 or other suitable devices. For the purpose of illustration, the method 200 will be described below with reference to the BS 110 in the wireless communication system 100.

The method 200 is entered in block 210, where a beam switch mode is determined based on a first measurement on quality of a current beam serving a mobile terminal. In embodiments of the present disclosure, a beam may be characterized by a beam width, a beam direction, coverage and other suitable factors. A beam may be provided by the BS 110 in a variety of ways. By way of example, a beam may be provided based on a predefined beamforming matrix, which is conventional and thus is not detailed herein.

As used herein, the term "beam switch mode" refers to a mode for performing beam switching, such as the intra-node beam switch mode and the inter-node beam switch mode. The beam switch mode is associated with one or more candidate beams. A candidate beam may be a beam other than the current beam serving the mobile terminal 120. For example, if the intra-node beam switch mode is determined as the beam switch mode, the candidate beam may be a local beam provided by the BS 110, and if the inter-node beam switch mode is determined as the beam switch mode, the candidate beam may be a neighbor beam provided by the neighbor BS 130. As such, if the BS 110 informs the mobile terminal 120 the beam switch mode, the mobile terminal 120 may know the associated candidate beam(s) and thus may prepare to receive MRS(s) transmitted via the candidate beam(s).

In embodiments of the present disclosure, upon receipt of the first measurement on quality of a current beam serving the mobile terminal 120, the BS 110 may determine the beam switch mode based on the first measurement in a variety of ways. In an embodiment, two threshold values, namely, a first threshold value and a second threshold value, may be set in advance, wherein the second threshold value is set as being less than the first threshold. By comparing the first measurement with the first threshold value and the second threshold value, the BS 110 may determine which beam which mode is to be employed. For example, if the first measurement is between the first threshold value and the second threshold value, which may indicates that the quality of the current beam is not good enough, then the intra-node beam switch mode may be determined as the beam switch mode. If the first measurement is below the second threshold value, which may indicates that the quality of the current beam is quite low, then an inter-node beam switch mode may be determined as the beam switch mode.

In addition, in some embodiments, if the intra-node beam switch mode is determined as the beam switch mode, the BS 110 may determine one or more candidate beams from local beams, namely, a set of beams provided by the BS 110 excluding the current beam. The candidate beams may be all of the local beams or a portion of the local beams selected randomly or according to a predetermined policy. In an example, the candidate beams may be a predetermined number of local beams that are in proximity to the current beam. In another example, the candidate beams may be obtained according to solutions of Self-Optimized Network (SON). It is to be understood that the above examples for determining the candidate beams from the local beams are described for purpose of discussion, rather than limitation. Those skilled in the art would appreciate other suitable ways to determine the candidate beams. Via the candidate beams, the BS 110 may send MRSs to the mobile terminal 120.

Furthermore, in some embodiments, if the inter-node beam switch mode being determined as the beam switch mode, the BS 110 may determine one or more candidate beams from neighbor beams, for example, a set of beams provided by the neighbor BS 130, and trigger the BS 130 to send MRSs to the mobile terminal 120 via the candidate beams.

In block 220, an indication of the beam switch mode is sent to the mobile terminal to trigger the mobile terminal to perform a second measurement on a MRS associated with the at least one candidate beam. In some embodiments, the BS 110 sends the indication to the mobile terminal 120 to indicate that which of the intra-node beam switch mode and the inter-node beam switch mode is employed. Upon receipt of the indication, the mobile terminal 120 may know the candidate beam to transmit a MRS, perform a second measurement on the MRS, and transmit the second measurement to the BS 110.

In addition, in some embodiments, the BS 110 may determine a measurement scheme and/or report scheme associated with the beam switch mode determined in block

210, and send an indication of the measurement scheme and/or the report scheme to the mobile terminal 120. As used herein, the "measurement scheme" specifies a manner for performing the second measurement, and the "report scheme" specifies a manner for reporting the second measurement.

In an embodiment, if the intra-node beam switch mode is determined as the beam switch mode, the BS 110 may determine a first measurement scheme for measuring a first number of samples of the MRS. The first number may be set as a small value, for example, 1, 2, or 5, which is below a threshold number. The threshold number may be predefined according to in several ways, which is conventional and thus is not detailed herein.

On the other hand, if the inter-node beam switch mode is determined as the beam switch mode, the BS 110 may determine a second measurement scheme for measuring and filtering a second number of samples of the MRS. The second number may be a relatively large value which exceeds the threshold number, so that the second measurement can be performed over a quite stable time period. As such, the second measurement can be obtained in an accurate way. Additionally, inter-node ping-pong effect, which is conventionally caused by frequent switch among beams due to inaccurate measurement of beam quality and results in undesirable signaling overhead, can be mitigated based on the more accurate second measurement.

Alternatively, or in addition, in an embodiment, if the intra-node beam switch mode is determined as the beam switch mode, the BS 110 may determine a first report scheme for reporting the second measurement in a condensed format. By way of example, with respect to a candidate beam, the mobile terminal 120 may report the absolute value of the quality that is initially measured, and then report the difference between subsequent adjacent measurements. In this way, it is unnecessary to report the absolute quality measured for each candidate beam. As such, the size of a report for the second measurement can be reduced. On the other hand, if the inter-node beam switch mode is determined as the beam switch mode, the BS 110 may determine a second report scheme for reporting the second measurement in an uncondensed format. For instance, upon receipt of the second report, the mobile terminal 120 may report the second measurement in absolute values.

Additionally, in some embodiments, the indication of the beam switch mode may further include an indication of the measurement scheme and/or an indication of the report scheme associated with the beam switch mode. In alternative embodiments, instead of being sent in a combined way, the indication of the beam switch mode, the indication of the measurement scheme and the indication of the report scheme may be sent in a separate way, for example, in different signaling or messages.

It is to be understood that the measurement scheme and/or the report scheme are described merely for the purpose of illustration, without suggesting any limitation as to the scope of the present disclosure. Those skilled in the art will appreciate that the measurement scheme and/or the report scheme associated with the intra-node and inter node beam switch modes may be predefined at both the BS 110 and the mobile terminal 120 sides in advance. For example, the BS 110 may send high level signaling to inform the mobile terminal 120 the measurement scheme and/or the report scheme before the starting of the method 200. As such, when receiving the indication of the determined beam switch mode, the mobile terminal 120 can determine the associated measurement scheme and/or the report scheme by itself, without the need of receiving indications of the measurement scheme and/or the report scheme.

In block 230, in response to receiving the second measurement from the mobile terminal, a target beam is determined from the at least one candidate beam and the current beam based on the second measurement. In some embodiments, there may be only one candidate beam, thus the target beam may be determined from the candidate beam and the current beam. In the example of FIG. 1, if the intra-node beam switch mode is employed, the target beam may be determined from the candidate beam 111 and the current beam 112. In an embodiment, if the second measurement is better than the first measurement, that is, the quality of the candidate beam 111 is better than that of the current beam 112, it may be determined the candidate beam 111 as the target beam. In another embodiment, the BS 110 may further send a MRS to the mobile terminal 120 via the current beam. The mobile terminal 120 may obtain a third measurement on the MRS and report it to the BS 110. In this case, in the determination of the target beam, if the second measurement exceeds the third measurement, the candidate beam may be determined as the target beam. If the second measurement is below the third measurement, the current beam may be determined as the target beam. As such, the target beam may be determined based on measurements on MRSs sent from the candidate beam and the current beam at proximate time points, instead of measurements on different reference signals sent at different time points. As a result, the target beam can be determined in a more accurate way.

Alternatively, or in addition, if there are a plurality of candidate beams, the BS 110 may determine a maximum measurement from a plurality of second measurements associated with the plurality of candidate beams. Then, the BS 110 may compare the maximum measurement and the first measurement. In response to the maximum measurement exceeding the first measurement, the BS 110 may determine a candidate beam corresponding to the maximum measurement from the plurality of candidate beams as the target beam. Otherwise, the BS 110 may determine the current beam as the target beam. It is to be understood that above example is only illustrated for discussion, rather than limitation. Those skilled in the art would appreciate that the BS 110 may compare the maximum measurement with the third measurement. In response to the maximum measurement exceeding the third measurement, the BS 110 may determine a candidate beam corresponding to the maximum measurement from the plurality of candidate beams as the target beam. Otherwise, the BS 110 may determine the current beam as the target beam.

As discussed above, the beam switch mode is determined from the intra-node beam switch mode and inter-node beam switch mode according to quality of the current beam, instead of using both of them in an undistinguished way. As a result, a better serving beam for the mobile terminal 120 may be determined in an efficient way.

In accordance with embodiments of the present disclosure, optionally, in response to the target beam being different from the current beam, the BS 110 may switch the mobile terminal from the current beam to the target beam. In embodiments of the present disclosure, the switching may be implemented in a variety of ways. For instance, the switching may be implemented according to LTE schemes, future schemes designed for 5G, and/or any other schemes either currently known or to be developed in the future.

Now some example embodiments will be described with respect to FIG. 3. FIG. 3 shows a flowchart of a method 300 for beam switching implemented by a device in accordance with an embodiment of the present disclosure. The method 300 may be considered as a specific implementation of the method 200 described above with reference to FIG. 3. However, it is noted that this is only for the purpose of illustrating the principles of the present disclosure, rather than limiting the scope thereof.

The method 300 is entered in block 310, where the BS 110 receives a first measurement on quality of a current beam serving the mobile terminal 120. The first measurement may be obtained by the mobile terminal by measuring CSI-RS or DMRS from the current beam, and may indicate the quality of the current beam.

In block 320, it is determined whether the first measurement is between a first threshold value (referred to as "T1" hereafter) and a second threshold value (referred to as "T2" hereafter), wherein T2<T1. If so, it may be determined that the quality of the current beam is not so bad and it is possible to find a better beam from local beams. Thus, the method 300 proceeds to block 340, where the intra-node beam switch mode is determined as the beam switch mode. In block 341, the at least one candidate beam is determined from local beams. The candidate beams may be all of the local beams or a predetermined number of the local beams selected randomly or according to some rules. In block 342, a MRS is sent, from the BS 110, to the mobile terminal 120 via the candidate beam. Then the method 300 proceeds to block 360.

Referring back to block 320, if the first measurement is not between T1 and T2, then the method 300 goes to block 330, where it is determined whether the first measurement is less than T2. If so, it may be determined that the quality of the current beam is quite poor and it is less possible to find a better beam from local beams. Then, the inter-node beam switch mode is determined as the beam switch mode in block 350. In block 351, the at least one candidate beam is determined from neighbor beams. In block 352, the neighbor device, for example, the BS 130, is triggered to send a MRS to the mobile terminal 120 via the candidate beam.

In block 360, an indication of the beam switch mode is sent to the mobile terminal. Aspects of this block are similar to those discussed with respect to block 220, and thus are not detailed herein.

In block 370, a maximum measurement is determined from second measurements received from the mobile terminal. In block 380, it is determined whether the maximum measurement exceeds the first measurement. If so, the method 300 goes to block 381, where a candidate beam corresponding to the maximum measurement is determined as the target beam. Otherwise, the method 300 goes to block 382, where the current beam is determined as the target beam.

In this way, the intra-node beam switch and inter-node beam switch can be treated differently. As such, the inter-node beam switch may be triggered only when the quality of current serving node is not good enough. This helps to reduce the unnecessary inter-node signaling and reduce possibility of inter-node ping-pong effect.

Figure 4:
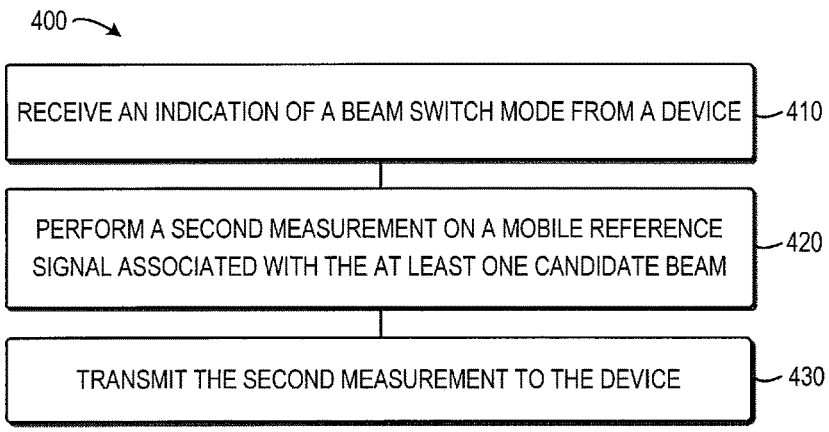
FIG. 4 shows a flowchart of a method 400 for beam switching implemented by a mobile terminal in accordance with an embodiment of the present disclosure.

FIG. 4 shows a flowchart of a method 400 for beam switching implemented by a mobile terminal in accordance with an embodiment of the present disclosure. With the method 400, the above and other potential deficiencies in the conventional approaches can be overcome. It would be appreciated that the method 400 may be implemented by a device, such as the mobile terminal 120 or other suitable devices. For the purpose of illustration, the method 400 will be described below with reference to the mobile terminal 120 in the wireless communication system 100.

The method 400 is entered in block 410, where an indication of a beam switch mode is received from a device. The indication is determined by the device, for example, the BS 110, based on a first measurement on quality of a current beam serving the mobile terminal 120. The determination of the indication may be implemented according to the method 200 or the method 300 as discussed above, and thus the details are not repeated here. The beam switch mode may be the intra-node beam switch mode or the inter-node beam switch mode. In the intra-node beam switch mode, the candidate beam may be determined from local beams, and in the inter-node beam switch mode, the candidate beam may be determined from neighbor beams. Thus, the beam switch mode is associated with at least one candidate beam.

As discussed above, the BS 110 may determine one or more candidate beams from local beams or neighbor beams depending on the determined beam switch mode. If the intra-node beam switch mode is determined as the beam switch mode, the BS 110 may determine one or more candidate beams from local beams and transmit MRSs via the candidate beams to the mobile terminal 120. If the inter-node beam switch mode is determined as the beam switch mode, the BS 110 may determine the candidate beams from neighbor beams and trigger the neighbor device, for example, the BS 130 to transmit MRSs via the candidate beams to the mobile terminal 120. Then, the mobile terminal 120 may measure the MRSs as discussed below.

In block 420, a second measurement is performed on a MRS associated with the at least one candidate beam. In some embodiments, the intra-node beam switch mode is determined as the beam switch mode, and the at least one candidate beam is determined from local beams, that is, a set of beams provided by the device excluding the current beam. In the example of FIG. 1, since there is only one local beam 111, it may be directly determined as the candidate beam. In this case, the mobile terminal 120 may receive the MRS from the BS 110 via the local beam 111.

Alternatively, in some embodiments, the inter-node beam switch mode is determined as the beam switch mode, and the at least one candidate beam is determined based on a set of beams provided by a neighbor device of the device, for example, determined as the neighbor beams 131 and 132. In this case, the mobile terminal 120 may receive the MRSs from the BS 130 via the local beam 131 and 132.

In block 430, the second measurement is transmitted to the device, to trigger the device to determine a target beam from the at least one candidate beam and the current beam based on the second measurement. When performing the second measurement, the mobile terminal 120 may measure the MRS(s) according to a measurement scheme and/or a report scheme. As discussed above, the measurement scheme and/or the report scheme may be predefined at the mobile terminal side or at the BS side. As an alternative, the mobile terminal 120 may receive an indication of the measurement scheme and/or an indication of the report scheme from the BS 110. Then, the mobile terminal 120 may perform the second measurement according to the measurement scheme, and/or report the second measurement to the BS 110 according to the report scheme.

In some embodiment where the BS 110 sends a MRS via the current beam to the mobile terminal 120, the mobile terminal 120 may further perform a third measurement on the MRS and report the third measurement to the BS 110. As such, the BS 110 may determine the target beam by comparing the second measurement with the third measurement.

If the second measurement exceeds the third measurement, the candidate beam may be determined as the target beam. Otherwise, the current beam may be determined as the target beam.

Figure 5:
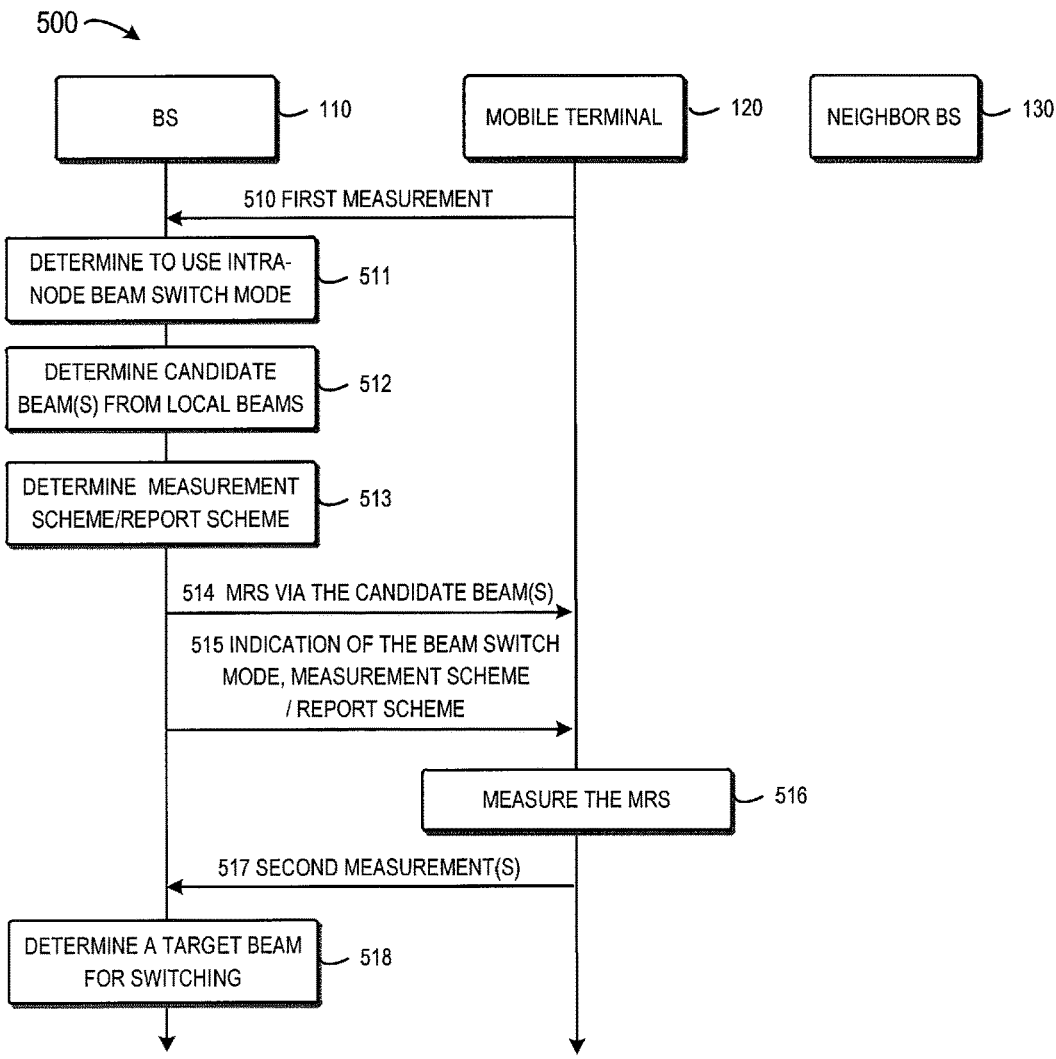
FIG. 5 shows a diagram 500 of the intra-node beam switch mode in accordance with an embodiment of the present disclosure.

FIG. 5 shows a diagram 500 of the intra-node beam switch mode in accordance with an embodiment of the present disclosure. In the example of FIG. 5, the BS 110 acts as the serving node of the mobile terminal 120, and has a neighbor node, namely, the neighbor BS 130. It would be appreciated that the diagram 500 is described with reference to the wireless communication system 100 for the purpose of illustration, rather than limitation.

In the example of FIG. 5, in procedure 510, the BS 110 receives a first measurement which indicates quality of a current beam 112 provided by the BS 110. In block 511, the BS 110 determines to employ the intra-node beam switch mode based on the first measurement. Such determination may be made according to block 210 of the method 200, or according to blocks 310, 320 and 340 of the method 300. Since the intra-node beam switch mode is employed, in block 512, the BS 110 determines one or more candidate beam from local beams, as discussed in block 341 of the method 300. In block 513, the BS 110 determines a measurement scheme and/or a report scheme associate with the intra-node beam switch mode. It is to be understood that block 513 is optional, and in an alternative embodiment, the measurement scheme and/or the report scheme may be predefined at both the BS 110 side and the mobile terminal 120 side. It is further to be understood that, although block 513 is described after block 512, it is merely for illustration rather than limitation. Those skilled in the art would readily appreciate that block 513 may precedes or be in parallel to block 512.

Since the intra-node beam switch mode is employed, in procedure 514, the BS 110 transmits the MRS via the candidate beam determined in block 512, for example, the local beam 111. In procedure 515, the BS 110 sends the indication of the beam switch mode to the mobile terminal 120, and the indication of the measurement scheme and/or the report scheme. As an alternative, in some embodiment where the measurement scheme and/or the report scheme have been predefined, there is no need to send the indication of the measurement scheme and/or the report scheme.

Upon receipt of the indication, the mobile terminal 120 knows that the intra-node beam switch mode is employed and the measurement scheme/report scheme to be used in measuring the MRS, and thus obtains the second measurement(s) in block 516. Then, the mobile terminal 120 sends the second measurement(s) to the BS 110 in procedure 517. Upon receipt of the second measurement(s), the BS 110 determines a target beam from the candidate beam(s) and the current beam by determining the largest one from the first measurement and the second measurement(s) in block 518.

Figure 6:
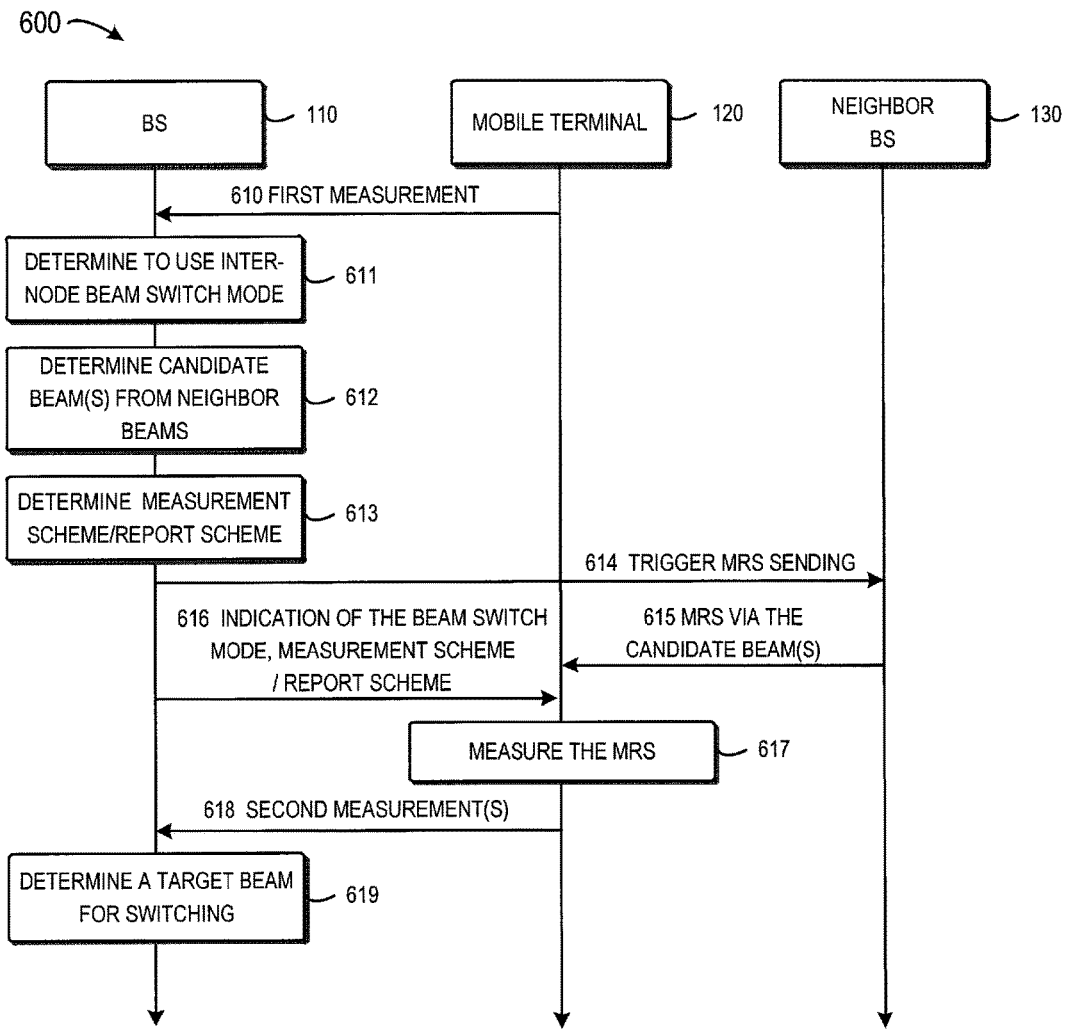
FIG. 6 shows a diagram 600 of the inter-node beam switch mode in accordance with another embodiment of the present disclosure.

FIG. 6 shows a diagram 600 of the inter-node beam switch mode in accordance with another embodiment of the present disclosure. In the example of FIG. 6, the BS 110 acts as the serving node of the mobile terminal 120, and has a neighbor node, namely, the neighbor BS 130. It would be appreciated that the diagram 600 is described with reference to the wireless communication system 100 for the purpose of illustration, rather than limitation.

In the example of FIG. 6, in procedure 610, the BS 110 receives a first measurement which indicates quality of a current beam 112 provided by the BS 110. In block 611, the BS 110 determines to employ the inter-node beam switch mode based on the first measurement. Such determination may be made according to block 210 of the method 200, or according to blocks 310-330 and 350 of the method 300. Since the inter-node beam switch mode is employed, in block 612, the BS 110 determines one or more candidate beams from neighbor beams, for example, the beams 131 and 132. This block may be performed in an analogue way as what is discussed in block 351 of the method 300. In block 613, the BS 110 determines a measurement scheme and/or a report scheme associated with the inter-node beam switch mode. It is to be understood that block 613 is optional, and in an alternative embodiment, the measurement scheme and/or the report scheme may be predefined at both the BS 110 side and the mobile terminal 120 side. It is further to be understood that, although block 613 is described after block 612, it is merely for illustration rather than limitation. Those skilled in the art would readily appreciate that block 613 may precedes or be in parallel to block 612.

Since the inter-node beam switch mode is employed, in procedure 614, the BS 110 triggers the neighbor BS 130 to send a MRS to the mobile terminal 120 via the candidate beam(s). In procedure 615, the neighbor BS 130 sends the MRS via the candidate beam(s) to the mobile terminal 120. In procedure 616, the BS 110 sends, to the mobile terminal 120, an indication of the beam switch mode, the measurement scheme and/or the report scheme. As an alternative, in some embodiment where the measurement scheme and/or the report scheme have been predefined, there is no need to send the indication of the measurement scheme and/or the report scheme in the procedure 616. It is further to be understood that, although the procedure 616 is described after the procedure 614 and/or 615, it is merely for illustration rather than limitation. Those skilled in the art would readily appreciate that the procedure 616 may precede or be in parallel to the procedure 614 and/or 615.

Upon receipt of the indication, the mobile terminal 120 knows that the inter-node beam switch mode is employed and the measurement scheme/report scheme to be used in measuring the MRS received from the neighbor BS 130, and thus obtains the second measurement(s) in block 617. Then, the mobile terminal 120 sends the second measurement(s) to the BS 110 in procedure 618. Upon receipt of the second measurement(s), the BS 110 determines a target beam from the candidate beam(s) and the current beam by determining the largest one from the first measurement and the second measurement(s) in block 619.

Figure 7:
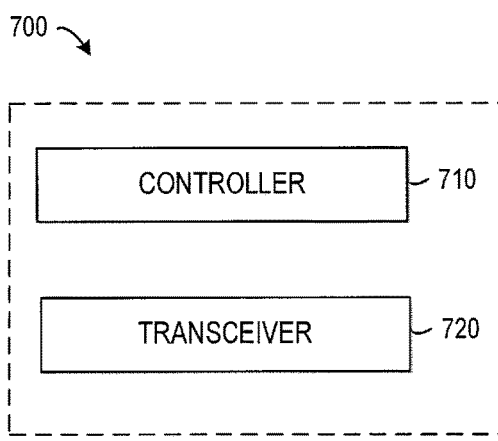
FIG. 7 shows a block diagram of a device 700 in accordance with an embodiment of the present disclosure.

FIG. 7 shows a block diagram of a device 700 in accordance with an embodiment of the present disclosure. It would be appreciated that the device 700 may be implemented by the BS 110 as shown in FIG. 1 or other suitable devices.

As shown, the device 700 includes a controller 710 and a transceiver 720. The controller 710 is configured to determine a beam switch mode based on a first measurement on quality of a current beam serving a mobile terminal, the beam switch mode being associated with at least one candidate beam. The transceiver 720 is configured to send an indication of the beam switch mode to the mobile terminal to trigger the mobile terminal to perform a second measurement on a mobile reference signal associated with the at least one candidate beam. The controller 710 is further configured to determine a target beam from the at least one candidate beam and the current beam based on the second measurement.

In an embodiment, the controller 710 may be further configured to: in response to the first measurement being between a first threshold value and a second threshold value less than the first threshold value, determine an intra-node beam switch mode as the beam switch mode; and in response to the first measurement being below the second threshold value, determine an inter-node beam switch mode as the beam switch mode.

In an embodiment, the controller 710 may be further configured to: in response to an intra-node beam switch mode being determined as the beam switch mode, determine the at least one candidate beam from a set of beams provided by the device, the set of beams excluding the current beam; and send a mobile reference signal to the mobile terminal via the at least one candidate beam.

In an embodiment, the controller 710 may be further configured to: in response to an inter-node beam switch mode being determined as the beam switch mode, determine the at least one candidate beam from a set of beams provided by a neighbor device of the device; and trigger the neighbor device to send a mobile reference signal to the mobile terminal via the at least one candidate beam.

In an embodiment, the controller 710 may be further configured to: determine a measurement scheme associated with the beam switch mode, the measurement scheme specifying a manner for performing the second measurement. The transceiver 720 may be further configured to send an indication of the measurement scheme to the mobile terminal.

In an embodiment, the controller 710 may be further configured to: in response to the intra-node beam switch mode being determined as the beam switch mode, determine a first measurement scheme for measuring a first number of samples of the mobile reference signal, the first number being below a threshold number; and in response to the inter-node beam switch mode being determined as the beam switch mode, determine a second measurement scheme for measuring and filtering a second number of samples of the mobile reference signal, the second number exceeding the threshold number.

In an embodiment, the controller 710 may be further configured to: determine a report scheme associated with the beam switch mode, the report scheme specifying a manner for reporting the second measurement. The transceiver 720 may be further configured to send an indication of the report scheme to the mobile terminal.

In an embodiment, the controller 710 may be further configured to: in response to the intra-node beam switch mode being determined as the beam switch mode, determine a first report scheme for reporting the second measurement in a condensed format; and in response to the inter-node beam switch mode being determined as the beam switch mode, determine a second report scheme for reporting the second measurement in an uncondensed format.

In an embodiment, the at least one candidate beam may include a plurality of candidate beams. The controller 710 may be further configured to: determine a maximum measurement from a plurality of second measurements associated with the plurality of candidate beams; in response to the maximum measurement exceeding the first measurement, determine a candidate beam corresponding to the maximum measurement from the plurality of candidate beams as the target beam; and in response to the maximum measurement being below the first measurement, determine the current beam as the target beam.

In an embodiment, the controller 710 may be further configured to: in response to the target beam being different from the current beam, switch the mobile terminal from the current beam to the target beam.

Figure 8:
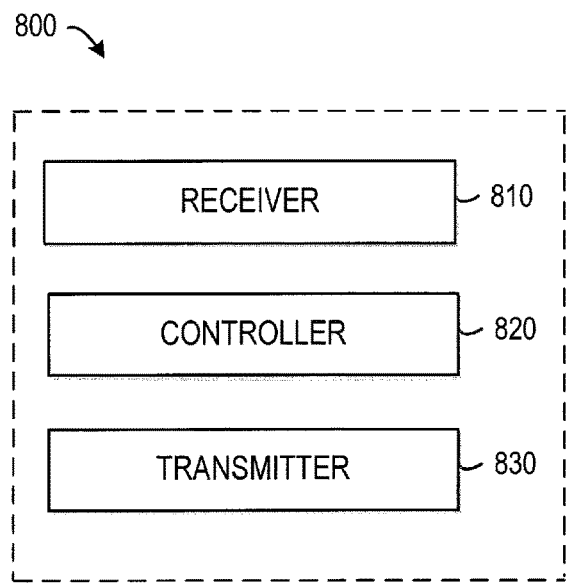
FIG. 8 shows a block diagram of a mobile terminal 800 in accordance with an embodiment of the present disclosure.

FIG. 8 shows a block diagram of a mobile terminal 800 in accordance with an embodiment of the present disclosure.

It would be appreciated that the mobile terminal 800 may be implemented by the mobile terminal 120 as shown in FIG. 1 or other suitable devices.

As shown, the device 800 includes a receiver 810, a controller 820 and a transmitter 830. The receiver 810 is configured to receive an indication of a beam switch mode from a device, the indication being determined based on a first measurement on quality of a current beam serving the mobile terminal, and the beam switch mode being associated with at least one candidate beam. The controller 820 is configured to perform a second measurement on a mobile reference signal associated with the at least one candidate beam. The transmitter 830 is configured to transmit the second measurement to the device to trigger the device to determine a target beam from the at least one candidate beam and the current beam based on the second measurement.

In an embodiment where the intra-node beam switch mode is determined as the beam switch mode, the at least one candidate beam is determined from a set of beams provided by the device, and the set of beams excludes the current beam, the receiver 810 may be further configured to: receive a mobile reference signal from the device via the at least one candidate beam.

In an embodiment where the inter-node beam switch mode is determined as the beam switch mode, and the at least one candidate beam is determined based on a set of beams provided by a neighbor device of the device, the receiver 810 may be further configured to: receive a mobile reference signal from the neighbor device via the at least one candidate beam.

In an embodiment, the receiver 810 may be further configured to receive an indication of a report scheme from the device. The report scheme may be associated with the beam switch mode and specify a manner for reporting the second measurement. The transmitter 830 may be further configured to transmit the second measurement to the device according to the report scheme.

In an embodiment, the receiver 810 may be further configured to receive an indication of a measurement scheme from the device, the measurement scheme specifying a manner for performing the second measurement. The controller 820 may be further configured to perform the second measurement according to the measurement scheme.

It should be appreciated that components included in the device 700 correspond to the blocks of the methods 200-300, and components included in the mobile terminal 800 correspond to the blocks of the method 400. Therefore, all operations and features described above with reference to FIGS. 2 to 3 are likewise applicable to the components included in the device 700 and have similar effects, and all operations and features described above with reference to FIG. 4 are likewise applicable to the components included in the mobile terminal 800 and have similar effects. For the purpose of simplification, the details will be omitted.

The components included in the device 700 and the mobile terminal 800 may be implemented in various manners, including software, hardware, firmware, or any combination thereof. In one embodiment, one or more units may be implemented using software and/or firmware, for example, machine-executable instructions stored on the storage medium. In addition to or instead of machine-executable instructions, parts or all of the components included in the device 700 and the mobile terminal 800 may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

In accordance with embodiments of the present disclosure, there is provided an apparatus implemented in a wireless communication network. It would be appreciated that the apparatus may be implemented at the BS 110 as shown in FIG. 1 or other suitable devices. The apparatus includes: means for determining a beam switch mode based on a first measurement on quality of a current beam serving a mobile terminal, the beam switch mode being associated with at least one candidate beam; means for sending an indication of the beam switch mode to the mobile terminal to trigger the mobile terminal to perform a second measurement on a mobile reference signal associated with the at least one candidate beam; and means for, in response to receiving the second measurement from the mobile terminal, determining a target beam from the at least one candidate beam and the current beam based on the second measurement.

In an embodiment, the means for determining a beam switch mode may include: means for, in response to the first measurement being between a first threshold value and a second threshold value less than the first threshold value, determining an intra-node beam switch mode as the beam switch mode; and means for, in response to the first measurement being below the second threshold value, determining an inter-node beam switch mode as the beam switch mode.

In an embodiment, the apparatus may further include: in response to an intra-node beam switch mode being determined as the beam switch mode, means for determining the at least one candidate beam from a set of beams provided by the device, the set of beams excluding the current beam; and means for sending a mobile reference signal to the mobile terminal via the at least one candidate beam.

In an embodiment, the apparatus may further include: in response to an inter-node beam switch mode being determined as the beam switch mode, means for determining the at least one candidate beam from a set of beams provided by a neighbor device of the device; and means for triggering the neighbor device to send a mobile reference signal to the mobile terminal via the at least one candidate beam.

In an embodiment, the apparatus may further include: means for determining a measurement scheme associated with the beam switch mode, the measurement scheme specifying a manner for performing the second measurement; and means for sending an indication of the measurement scheme to the mobile terminal.

In an embodiment, the means for determining a measurement scheme may include: means for, in response to the intra-node beam switch mode being determined as the beam switch mode, determining a first measurement scheme for measuring a first number of samples of the mobile reference signal, the first number being below a threshold number; and means for, in response to the inter-node beam switch mode being determined as the beam switch mode, determining a second measurement scheme for measuring and filtering a second number of samples of the mobile reference signal, the second number exceeding the threshold number.

In an embodiment, the apparatus may further include: means for determining a report scheme associated with the beam switch mode, the report scheme specifying a manner for reporting the second measurement; and means for sending an indication of the report scheme to the mobile terminal.

In an embodiment, the apparatus may further include: means for determining a report scheme includes: means for, in response to the intra-node beam switch mode being determined as the beam switch mode, determining a first report scheme for reporting the second measurement in a condensed format; and means for, in response to the inter-node beam switch mode being determined as the beam switch mode, determining a second report scheme for reporting the second measurement in an uncondensed format.

In an embodiment, the at least one candidate beam may include a plurality of candidate beams, and the means for determining a target beam may include: means for determining a maximum measurement from a plurality of second measurements associated with the plurality of candidate beams; means for, in response to the maximum measurement exceeding the first measurement, determining a candidate beam corresponding to the maximum measurement from the plurality of candidate beams as the target beam; and means for, in response to the maximum measurement being below the first measurement, determining the current beam as the target beam.

In an embodiment, the apparatus may further include: means for sending a mobile reference signal to the mobile terminal via the current beam; and means for receiving, from the mobile terminal, a third measurement on the mobile reference signal sent via the current beam. The means for determining a target beam includes: means for, in response to the second measurement exceeding the third measurement, determining the candidate beam as the target beam; and means for, in response to the second measurement being below the third measurement, determining the current beam as the target beam.

In accordance with embodiments of the present disclosure, there is provided an apparatus implemented in a wireless communication network. It would be appreciated that the apparatus may be implemented at the mobile terminal 120 as shown in FIG. 1 or other suitable devices. The apparatus includes: means for receiving an indication of a beam switch mode from a device, the indication being determined based on a first measurement on quality of a current beam serving the mobile terminal, and the beam switch mode being associated with at least one candidate beam; means for performing a second measurement on a mobile reference signal associated with the at least one candidate beam; and means for transmitting the second measurement to the device to trigger the device to determine a target beam from the at least one candidate beam and the current beam based on the second measurement.

In an embodiment where the intra-node beam switch mode is determined as the beam switch mode, the at least one candidate beam is determined from a set of beams provided by the device, and the set of beams excludes the current beam, the apparatus may further include: means for receiving a mobile reference signal from the device via the at least one candidate beam.

In an embodiment where the inter-node beam switch mode is determined as the beam switch mode, and the at least one candidate beam is determined based on a set of beams provided by a neighbor device of the device, the apparatus may further include: means for receiving a mobile reference signal from the neighbor device via the at least one candidate beam.

In an embodiment, the apparatus may further include means for receiving an indication of a report scheme from the device, the report scheme being associated with the beam switch mode and specifying a manner for reporting the second measurement; and means for transmitting the second measurement to the device according to the report scheme.

In an embodiment, the apparatus may further include means for receiving an indication of a measurement scheme from the device, the measurement scheme specifying a manner for performing the second measurement. In the embodiment, the means for performing a second measurement on a mobile reference signal may include: means for performing the second measurement according to the measurement scheme.

In an embodiment, the apparatus may further include means for performing a third measurement on a mobile reference signal sent via the current beam; and means for transmitting the third measurement to the device.

Figure 9:
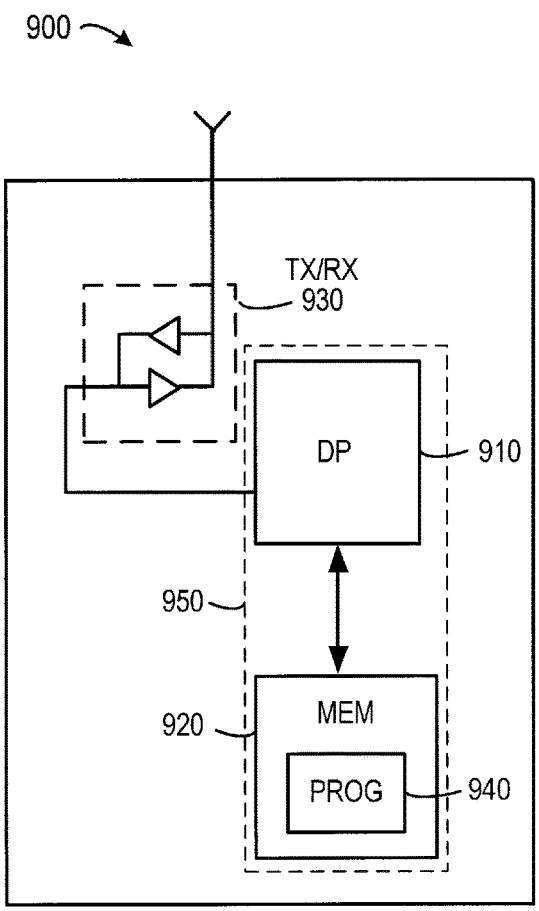
FIG. 9 shows a simplified block diagram 900 of a device that is suitable for use in implementing embodiments of the present disclosure.

FIG. 9 shows a simplified block diagram of a device 900 that is suitable for use in implementing embodiments of the present disclosure. It would be appreciated that the device 900 may be implemented by the device, such as, the BS 110, or a terminal device, for example the mobile terminal 120.

As shown, the device 900 includes a data processor (DP) 910, a memory (MEM) 920 coupled to the DP 910, a suitable RF transmitter TX and receiver RX 940 coupled to the DP 910, and a communication interface 950 coupled to the DP 910. The MEM 920 stores a program (PROG) 930. The TX/RX 940 is for bidirectional wireless communications. Note that the TX/RX 940 has at least one antenna to facilitate communication, though in practice an Access Node mentioned in this application may have several ones. The communication interface 950 may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The PROG 930 is assumed to include program instructions that, when executed by the associated DP 910, enable the device 900 to operate in accordance with the embodiments of the present disclosure, as discussed herein with the methods 200 to 300 in FIGS. 2 to 3 or the method 400 in FIG. 4. The embodiments herein may be implemented by computer software executable by the DP 910 of the device 900, or by hardware, or by a combination of software and hardware. A combination of the data processor 910 and MEM 920 may form processing means 960 adapted to implement various embodiments of the present disclosure.

The MEM 920 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the device 900, there may be several physically distinct memory modules in the device 900. The DP 910 may be of any type suitable to the local technical environment, and may include one or more of general purpose computers, special purpose computers, microprocessors, digital signal processors (DSPs) and processors based on multicore processor architecture, as non-limiting examples. The device 900 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

By way of example, embodiments of the present disclosure can be described in the general context of machine-executable instructions, such as those included in program modules, being executed in a device on a target real or virtual processor. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this disclosure, the device may be implemented in the general context of computer system-executable instructions, such as program modules, being executed by a computer system. Generally, program modules may include routines, programs, objects, components, logic, data structures, and so on that perform particular tasks or implement particular abstract data types. The device may be practiced in distributed cloud computing environments where tasks are performed by remote processing devices that are linked through a communications network. In a distributed cloud computing environment, program modules may be located in both local and remote computer system storage media including memory storage devices.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method implemented by a device in a wireless communication network, comprising:
   determining a beam switch mode based on a first measurement on quality of a current beam serving a mobile terminal, the beam switch mode being associated with at least one candidate beam, wherein the beam switch mode is determined between an intra-node beam switch mode and an inter-node beam switch mode;
   sending an indication of the beam switch mode to the mobile terminal to trigger the mobile terminal to perform a second measurement on a mobile reference signal associated with the at least one candidate beam, wherein the mobile reference signal is transmitted on demand; and
   determining a measurement scheme associated with the beam switch mode, the measurement scheme specifying a manner for performing the second measurement, wherein the determination of the measurement scheme comprises:
      in response to the intra-node beam switch mode being determined as the beam switch mode, determining a first measurement scheme for measuring a first number of samples of the mobile reference signal, the first number being below a threshold number; and
      in response to the inter-node beam switch mode being determined as the beam switch mode, determining a second measurement scheme for measuring and filtering a second number of samples of the mobile reference signal, the second number exceeding the threshold number;
   sending an indication of the measurement scheme to the mobile terminal; and
   in response to receiving the second measurement from the mobile terminal, determining a target beam from the at least one candidate beam and the current beam based on the second measurement.

2. The method according to claim 1, wherein determining the beam switch mode comprises:
   in response to the first measurement being between a first threshold value and a second threshold value less than the first threshold value, determining the intra-node beam switch mode as the beam switch mode; and
   in response to the first measurement being below the second threshold value, determining the inter-node beam switch mode as the beam switch mode.

3. The method according to claim 1, further comprising:
   in response to the intra-node beam switch mode being determined as the beam switch mode,
      determining the at least one candidate beam from a set of beams provided by the device, the set of beams excluding the current beam; and
      sending the mobile reference signal to the mobile terminal via the at least one candidate beam.

4. The method according to claim 1, further comprising:
   in response to the inter-node beam switch mode being determined as the beam switch mode,
      determining the at least one candidate beam from a set of beams provided by a neighbor device of the device; and
      triggering the neighbor device to send the mobile reference signal to the mobile terminal via the at least one candidate beam.

5. The method according to claim 1, further comprising:
   determining a report scheme associated with the beam switch mode, the report scheme specifying a manner for reporting the second measurement; and
   sending an indication of the report scheme to the mobile terminal.

6. The method of claim 5, wherein determining the report scheme comprises:
   in response to the intra-node beam switch mode being determined as the beam switch mode, determining a first report scheme for reporting the second measurement in a condensed format; and
   in response to the inter-node beam switch mode being determined as the beam switch mode, determining a second report scheme for reporting the second measurement in an uncondensed format.

7. The method according to claim 1, wherein the at least one candidate beam includes a plurality of candidate beams, and wherein determining the target beam comprises:
   determining a maximum measurement from a plurality of second measurements associated with the plurality of candidate beams;
   in response to the maximum measurement exceeding the first measurement, determining a candidate beam corresponding to the maximum measurement from the plurality of candidate beams as the target beam; and
   in response to the maximum measurement being below the first measurement, determining the current beam as the target beam.

8. The method according to claim 1, further comprising:
   sending another mobile reference signal to the mobile terminal via the current beam; and
   receiving, from the mobile terminal, a third measurement on the another mobile reference signal sent via the current beam,
   wherein determining the target beam comprises:
      in response to the second measurement exceeding the third measurement, determining the candidate beam as the target beam; and
      in response to the second measurement being below the third measurement, determining the current beam as the target beam.

9. A device comprising:
a data processor and memory coupled to the data processor, the memory containing program instructions, which when executed by the data processor, cause the device to:
   determine a beam switch mode based on a first measurement on quality of a current beam serving a mobile terminal, the beam switch mode being associated with at least one candidate beam, wherein the beam switch mode is determined between an intra-node beam switch mode and an inter-node beam switch mode,
   send an indication of the beam switch mode to the mobile terminal to trigger the mobile terminal to perform a second measurement on a mobile reference signal associated with the at least one candidate beam, wherein the mobile reference signal is transmitted on demand,
   determine a measurement scheme associated with the beam switch mode, the measurement scheme specifying a manner for performing the second measurement, wherein the determination of the measurement scheme is to:
      in response to the intra-node beam switch mode being determined as the beam switch mode, determine a first measurement scheme for measuring a first number of samples of the mobile reference signal, the first number being below a threshold number; and
      in response to the inter-node beam switch mode being determined as the beam switch mode, determine a second measurement scheme for measuring and filtering a second number of samples of the mobile reference signal, the second number exceeding the threshold number, and
   determine a target beam from the at least one candidate beam and the current beam based on the second measurement.

10. The device according to claim 9, wherein the device is further to:
   in response to the first measurement being between a first threshold value and a second threshold value less than the first threshold value, determine the intra-node beam switch mode as the beam switch mode, and
   in response to the first measurement being below the second threshold value, determine the inter-node beam switch mode as the beam switch mode.

11. The device according to claim 9, wherein the device is further to:
   in response to the intra-node beam switch mode being determined as the beam switch mode,
      determine the at least one candidate beam from a set of beams provided by the device, the set of beams excluding the current beam, and
      send the mobile reference signal to the mobile terminal via the at least one candidate beam.

12. The device according to claim 9, wherein the device is further to:
   in response to the inter-node beam switch mode being determined as the beam switch mode,
      determine the at least one candidate beam from a set of beams provided by a neighbor device of the device, and
      trigger the neighbor device to send the mobile reference signal to the mobile terminal via the at least one candidate beam.

13. The device according to claim 9, wherein the device is further to:
   determine a report scheme associated with the beam switch mode, the report scheme specifying a manner for reporting the second measurement, and
   send an indication of the report scheme to the mobile terminal.

14. The device of claim 13, wherein the device is further to:
   in response to the intra-node beam switch mode being determined as the beam switch mode, determine a first report scheme for reporting the second measurement in a condensed format, and
   in response to the inter-node beam switch mode being determined as the beam switch mode, determine a second report scheme for reporting the second measurement in an uncondensed format.

15. The device according to claim 9, wherein the at least one candidate beam includes a plurality of candidate beams, and wherein the device is further to:
   determine a maximum measurement from a plurality of second measurements associated with the plurality of candidate beams,
   in response to the maximum measurement exceeding the first measurement, determine a candidate beam corresponding to the maximum measurement from the plurality of candidate beams as the target beam, and
   in response to the maximum measurement being below the first measurement, determine the current beam as the target beam.

16. The device according to claim 9, wherein the device is further configured to:
   send another mobile reference signal to the mobile terminal via the current beam, and
   receive, from the mobile terminal, a third measurement on the another mobile reference signal sent via the current beam,
   in response to the second measurement exceeding the third measurement, determine the candidate beam as the target beam, and in response to the second measurement being below the third measurement, determine the current beam as the target beam.

* * * * *